United States Patent [19]

Okuno et al.

[11] Patent Number: 5,724,627
[45] Date of Patent: Mar. 3, 1998

[54] IMAGE FORMING APPARATUS WHICH CALCULATES TONER CONSUMPTION IN ACCORDANCE WITH TONE CORRECTION

[75] Inventors: Yukihiko Okuno, Toyokawa; Masaki Tanaka, Toyohashi; Naoyoshi Kinoshita, Aichi-Ken, all of Japan

[73] Assignee: Minolta Co., Ltd., Osaka, Japan

[21] Appl. No.: 558,103

[22] Filed: Nov. 17, 1995

[30] Foreign Application Priority Data

Nov. 18, 1994 [JP] Japan ................... 6-284925

[51] Int. Cl.$^6$ .................................. G03G 15/08
[52] U.S. Cl. ................... 399/27; 399/49; 399/58
[58] Field of Search ....................... 355/208, 246; 347/246, 130–1, 140, 158, 240, 251–254, 236; 399/27, 258, 58, 49

[56] References Cited

U.S. PATENT DOCUMENTS

| | | | |
|---|---|---|---|
| 5,146,274 | 9/1992 | Hattori et al. | 355/208 |
| 5,202,769 | 4/1993 | Suzuki | 358/300 |
| 5,305,057 | 4/1994 | Hattori et al. | 355/203 |
| 5,420,614 | 5/1995 | Fukui et al. | 346/130 |

FOREIGN PATENT DOCUMENTS

| | | |
|---|---|---|
| 63-40179 | 2/1988 | Japan . |
| 63-292172 | 11/1988 | Japan . |
| 2-19873 | 1/1990 | Japan . |
| 5-27597 | 2/1993 | Japan . |
| 5-27598 | 2/1993 | Japan . |

*Primary Examiner*—Arthur T. Grimley
*Assistant Examiner*—Quana Grainger
*Attorney, Agent, or Firm*—Burns, Doane, Swecker & Mathis, LLP

[57] ABSTRACT

In an electrophotographic image forming apparatus, a correction coefficient corresponding to each density level of toner consumption of a developing device is determined in accordance with a selected tone correction method, and/or the ratio of the emission period to the non-emission period of a light source. A toner consumption calculator multiplies the correction coefficients by the number of pixels of each density level of document image data, and determines the amount of toner consumed by the developing device from the sum total value of the multiplication results determined for each density level. A toner replenishment device resupplies toner to the developing device based on the determined amount of consumed toner. As a result, a constant toner concentration Tc normally can be maintained because toner is resupplied based on the calculated amount of toner consumption.

12 Claims, 12 Drawing Sheets

Standard

FIG.7(a) LIMOS 1 (1 Dot, 100%)

FIG.7(b) LIMOS 2 (2 Dots, 80%)

FIG.7(c) LIMOS 3 (2 Dots, 60%)

| Amount of Adhered Toner (mg/cm²) | Vg (V) | Vb (V) |
|---|---|---|
| 0.625 | 500 | 280 |
| 0.510 | 540 | 320 |
| ⋮ | ⋮ | ⋮ |
| 0.340 | 670 | 420 |
| ⋮ | ⋮ | ⋮ |
| 0.210 | 900 | 620 |
| 0.180 | 1000 | 710 |

| Tone Expression Pattern | Condition | | |
|---|---|---|---|
| | LIMOS 1 | LIMOS 2 | LIMOS 3 |
| Cycle | N=1 | N=2 | N=3 |
| Duty Ratio | 100% | 80% | 60% |
| Correction Coefficient ($\beta$) | 1.0 | 1.1 | 1.2 |

IMAGE FORMING APPARATUS WHICH CALCULATES TONER CONSUMPTION IN ACCORDANCE WITH TONE CORRECTION

BACKGROUND OF THE INVENTION

1. Field of the Invention

The present invention relates to an image forming apparatus of the electrophotographic type.

2. Description of the Related Art

In an image forming apparatus of the electrophotographic type, two-component developers comprising a mixture of a carrier and a toner typically are used to develop an electrostatic latent image formed on the surface of a photosensitive member. When a two-component developer is used, the toner concentration Tc in the developer (the weight ratio of toner per total weight of developer) changes because toner alone is consumed in conjunction with image formation, such that a suitable amount of toner must be resupplied to the developer so as to maintain the toner concentration Tc at a predetermined standard value.

Conventional toner replenishment control methods include well-known methods such as methods wherein the magnetic permeability of the developer is sensed via a magnetic sensor, or the amount of light reflected by the developer is detected by an optical sensor so as to estimate the toner concentration Tc in the developer and resupply the required amount of toner. In another known method, the amount of light reflected by a toner test image formed on the surface of a photosensitive member under constant image forming conditions is detected by an optical sensor. The image density of the test image is calculated and toner concentration Tc in the developer is estimated from the calculated image density, so as to resupply the required amount of toner.

In methods for toner replenishment control using magnetic sensors, the magnetic permeability of the developer, i.e., the amount of carrier per unit volume of developer, is detected, and the toner concentration Tc is estimated therefrom. In toners which include silica and the like for the purposes of improving image quality and developer flow characteristics, the bulk density fluctuates in conjunction with changes in humidity and the like, such that erroneous detection by the magnetic sensor commonly occurs.

Methods of toner replenishment control that employ optical sensors cannot be used for developers wherein the carrier and toner have identical spectral reflectance characteristics, such as developers using toner mixed with carbon black.

In methods of toner replenishment control wherein the image density of a toner test image formed on a photosensitive member is detected, factors other than toner concentration Tc may produce image fogging and toner airborne dispersion when estimating the toner concentration Tc, such factors including fluctuations in developer characteristics and photosensitive member characteristics.

In order to eliminate the previously described disadvantages in an image forming apparatus of the digital type, a method has been proposed wherein the density level is calculated for each pixel of image data to be printed, and the amount of toner consumption is estimated directly from the calculated value so as to resupply to the developing device an amount of toner equivalent to the amount consumed (Japanese Unexamined Patent Application No. HEI 5-27598). Another method proposes to correct errors in estimating the amount of consumed toner by means of the difference in image density level distributions of a document, wherein the density level of document image data is selected for a plurality of areas of the document image, and conversion coefficients are set for the amount of toner consumption in each area (Japanese Unexamined Patent Application No. HEI 5-27597). In the aforesaid digital image forming apparatuses, stable results can be obtained without being influenced by the type of developer.

Toner consumption is not determined by image data alone, and may change in accordance with the various types of halftone curves used for tone correction. In the case of an image forming apparatus of the electrophotographic type, recording methods are used wherein a non-emission period is provided during the laser emission period of an N-dot cycle for the purpose of reducing noise between lines of an image reproduced on paper. For example, in such an image forming apparatus, as much as 30% of one pixel clock cycle is set for non-emission, such that the amount of toner necessary to form images of documents having identical densities may differ. In such cases, toner consumption cannot be accurately estimated by only simple calculation of the density level of the image data.

SUMMARY OF THE INVENTION

An object of the present invention is to provide an image forming apparatus capable of accurately estimating toner consumption from image data and maintaining a constant toner concentration Tc based on such an estimation.

In one aspect of the invention, a correction coefficient corresponding to each density level of toner consumption of a developing device is determined by a correction coefficient setting means in accordance with a tone correction method selected by a selection means. A toner consumption calculation means multiplies the correction coefficients by the number of pixels of each density level of document image data determined by a counting means, and determines the amount of toner consumed by the developing device from the sum total value of the multiplication results determined for each density level. The toner replenishment means resupplies toner to the developing device based on the determined amount of consumed toner. Accordingly, accurate toner consumption calculation is accomplished for any of the aforesaid tone correction methods, i.e., a constant toner concentration Tc normally can be maintained because toner is resupplied based on the calculated amount of toner consumption.

In another aspect of the invention, a correction coefficient corresponding to each density level of toner consumption in a developing device is calculated by a correction coefficient setting means in accordance with the ratio of the emission period to the non-emission period of a light source. The toner consumption calculation means multiplies the correction coefficient by the number of pixels of each density level of document image data determined by the counting means, and determines the amount of toner consumed by the developing device from the sum total value of multiplication results determined for each density level. The toner replenishment means resupplies toner to the developing device based on the determined amount of consumed toner. Accordingly, accurate toner consumption calculation is accomplished for any of the aforesaid tone correction methods, i.e., a constant toner concentration Tc normally can be maintained because toner is resupplied based on the calculated amount of toner consumption.

DESCRIPTION OF THE PREFERRED EMBODIMENTS

The full color copying apparatus of the disclosed embodiment of the invention uses a correction coefficient that is determined on the basis of the pixel frequency at each density level of a document read by image scanning, as well as tone curves and tone expression patterns (set by the emission duty ratio and emission cycle of the laser which exposes the photosensitive member) selected by an operator. This correction coefficient is used to estimate the amount of toner consumed in copying a document, so as to resupply toner based on the estimated value. Thus, the amount of toner resupplied is the same as the amount of toner consumed, and toner concentration Tc (the toner weight ratio relative to the total weight of the developer) in the developer remains constant within the toner developing device. The aforesaid tone expression pattern is determined by the emission duty ratio X (%) and the emission period N (dots) of the laser which exposes the photosensitive member. The aforesaid duty ratio expresses the percentage of the laser emission period within the N-dot period. For example, when the period N=2 (dots) and the emission duty ratio is set at 80%, laser light is emitted during 80% of the laser emission period for each 2-dot pair, and laser light is not emitted during the remaining 20% of the period. In this case, toner adheres to the copy sheet as shown in FIG. 7(b). The halftone curve and tone expression pattern are discussed in detail later.

A copying apparatus in accordance with the present invention is described hereinafter with reference to the accompanying drawings and in the sequence indicated below.

Figure 1:
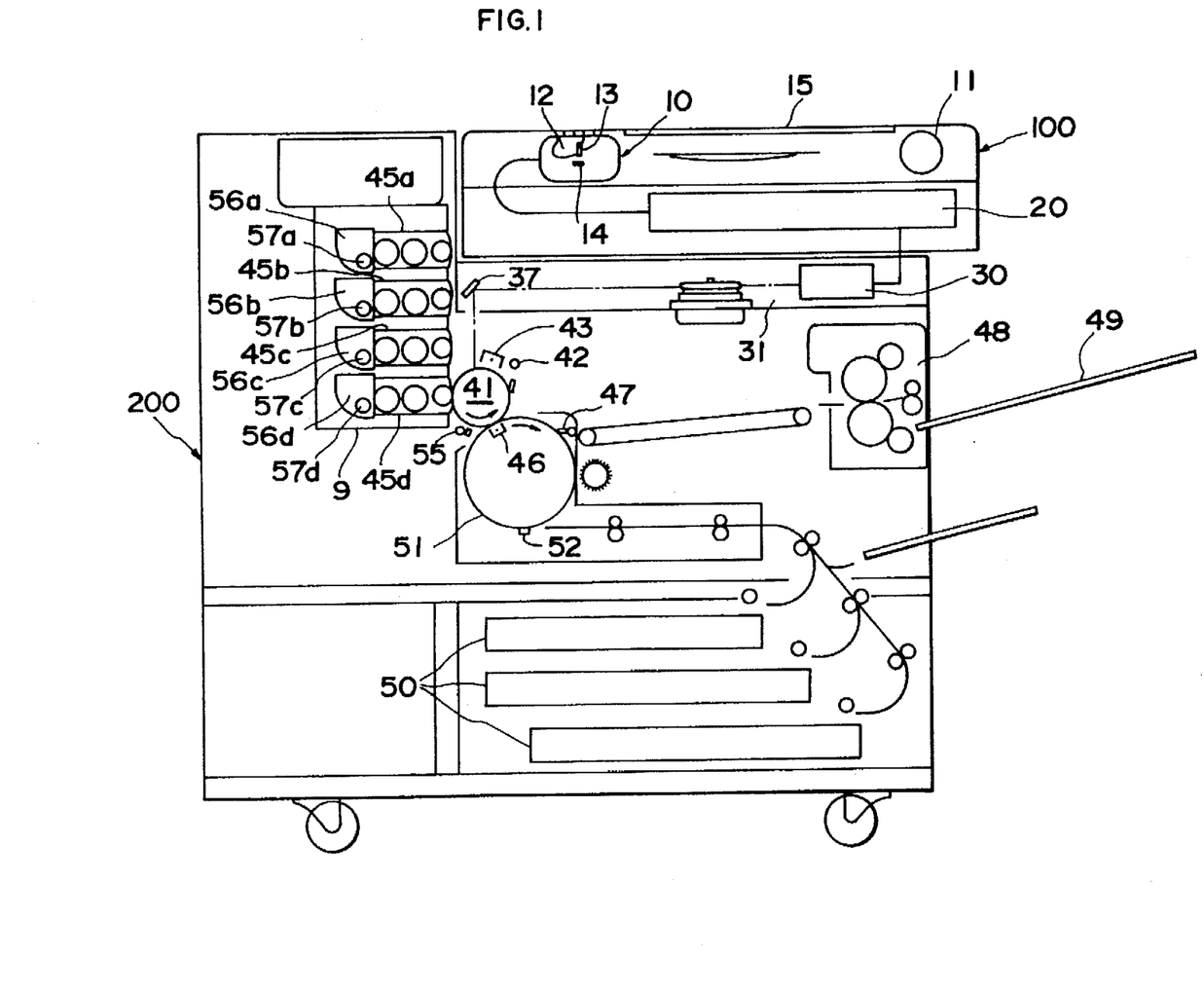
FIG. 1 shows the general construction of a full color digital copying apparatus of the present invention.

(1) Construction of the digital copying apparatus
(1-1) Construction of the digital copier unit
(1-2) Operation panel
(1-3) Processing block
(2) Toner replenishment control
(2-1) Automatic image density control and tone correction
(2-2) Halftone curve, tone expression pattern and toner replenishment calculation (1) Construction of the Digital Copying Apparatus (1-1) Construction of the Digital Copier Unit FIG. 1 shows the general construction of a full color digital copier in accordance with the present invention. This full color digital copier can be broadly divided into an image reader unit 100 for reading, or scanning, document images, and a printer unit 200 for reproducing on a paper document an image scanned by the image reader unit 100.

The construction of the image reader unit 100 is a conventional construction, comprising a scanner 10, an exposure lamp 12 for illuminating original documents, a rod lens array 13 for focusing the light reflected from the original document, and a contact-type charge-coupled device (CCD) color image sensor 14 for converting the focused light into multi-level electrical signals. Scanner 10 is driven by a motor 11 during document scanning so as to move in the direction of the arrow (subscan direction), to scan a document placed on a platen 15. The light reflected by the document surface illuminated by exposure lamp 12 is subjected to photoelectric conversion by the image sensor 14. Multi-level electrical signals of the three colors red (R), green (G), and blue (B) obtained by the image sensor 14 are converted to 256 halftone density level signals of cyan (C), magenta (M), yellow (Y), and black (BK) by an image processing unit 20. These halftone density signals are simultaneously stored in a buffer memory (FIFO memory) 30.

The print head 31 of printer unit 200 performs tone correction on density level signals that are input as image data in a manner described in detail later. Tone correction means converts the input image data density levels to semiconductor laser emission intensity levels, such that the relationship between the document image density and the printed image density conforms to a user-selected halftone curve. Tone corrected image data is subjected to digital-to-analog (D/A) conversion and supplied to the semiconductor laser drive circuit to control laser emission intensity.

A laser beam modulated for emission intensity in accordance with 256 halftone density levels and emitted from the print head 31 exposes a rotatably driven photosensitive member 41 via a reflecting mirror 37. The photosensitive member 41 is irradiated by an eraser lamp 42 prior to image exposure of a single line, and is then uniformly charged by a charger 43. When image exposure occurs in this charged state, an electrostatic latent image of the original document is formed on the surface of the photosensitive member 41. A developing unit 9 is provided with a plurality of developing devices 45a–45d accommodating two-component developers comprising a toner and a carrier. These developing devices are moved as a unit in a vertical direction such that only one developing device accommodating a selected toner is positioned opposite the photosensitive member 41 to develop the latent image with the corresponding color toner, so as to render the latent image visible. Developing devices 45a–45d respectively accommodate color toners in cyan (C), magenta (M), yellow (Y), and black (BK), and are respectively provided with hoppers 56a–56d for storing toner to be resupplied to the developing device. Toner supply rollers 57a–57d deliver toner in the hopper into the developing device. The developed toner image is transferred onto a copy sheet wrapped around a transfer drum 51, by a transfer charger 46.

The printing process is repeated for the four colors of cyan (C), magenta (M), yellow (Y), and black (BK). At this time, scanner 10 repeats the scanning operation synchronously with the operations of photosensitive member 41 and transfer drum 51. Thereafter, the copy sheet is separated from transfer drum 51 via the operation of a separation member 47, and passes through a fixing device 48 where the toner image is fixed to the copy sheet which is subsequently ejected to a discharge tray 49. Copy sheets are supplied from a paper cassette 50 and the leading edge of the copy sheet is chucked on the transfer drum 51 by means of a chucking mechanism 52 so as to prevent dislocation during image transfer.

(1-2) Operation Panel

Figure 2:
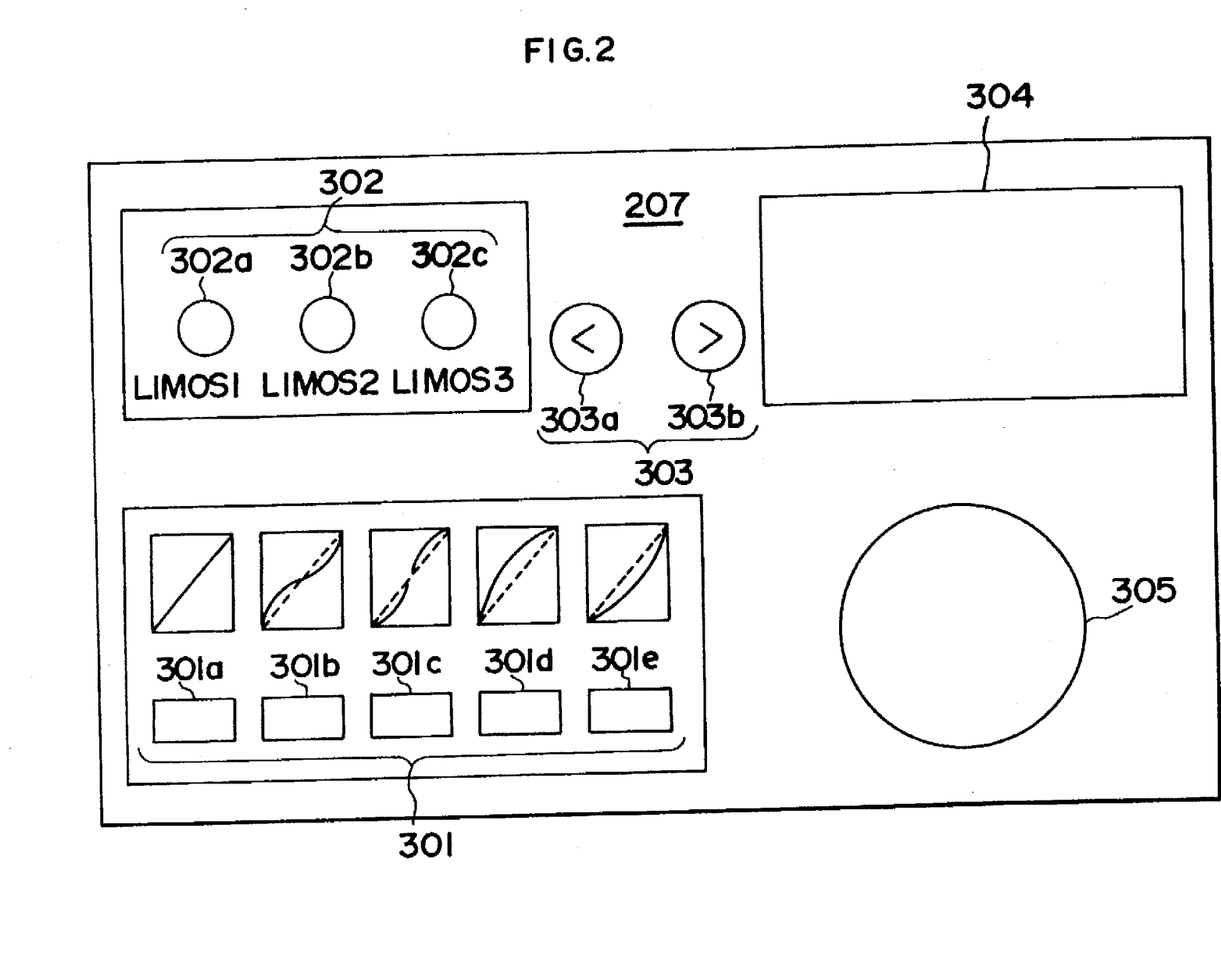
FIG. 2 is a front view of the operation panel of the full color digital copying apparatus.

FIG. 2 is a front view of the operation panel 207 provided on the digital copier. The operation panel 207 is provided with halftone curve selection keys 301 for selecting the halftone curve to be used in tone correction, tone expression pattern selection keys 302 for selecting a tone expression pattern, a key group 303 for increasing and decreasing the number of copies to be made, a display 304 for displaying the copy number which has been set, and copy start key 305 for starting a copy operation. The copying apparatus of the present embodiment allows a non-emission period to be set as a predetermined percentage of the laser emission period for an N-dot cycle when the photosensitive member 41 is exposed by the laser. Thus, noise is reduced between the lines of the reproduced image formed on the copy sheet. The three keys 302a, 302b, and 302c of tone expression display keys 302 are keys which selectably set the aforesaid predetermined cycle N (dots) and the emission duty ratio (%) of cycle N. Sheet number keys 303 are keys which set the number of copies to be made, and comprise plus (+) key 303a and minus (−) key 303b. The copy number set via the keys 303 is displayed by the display 304.

(1-3) Processing Block

Figure 3:
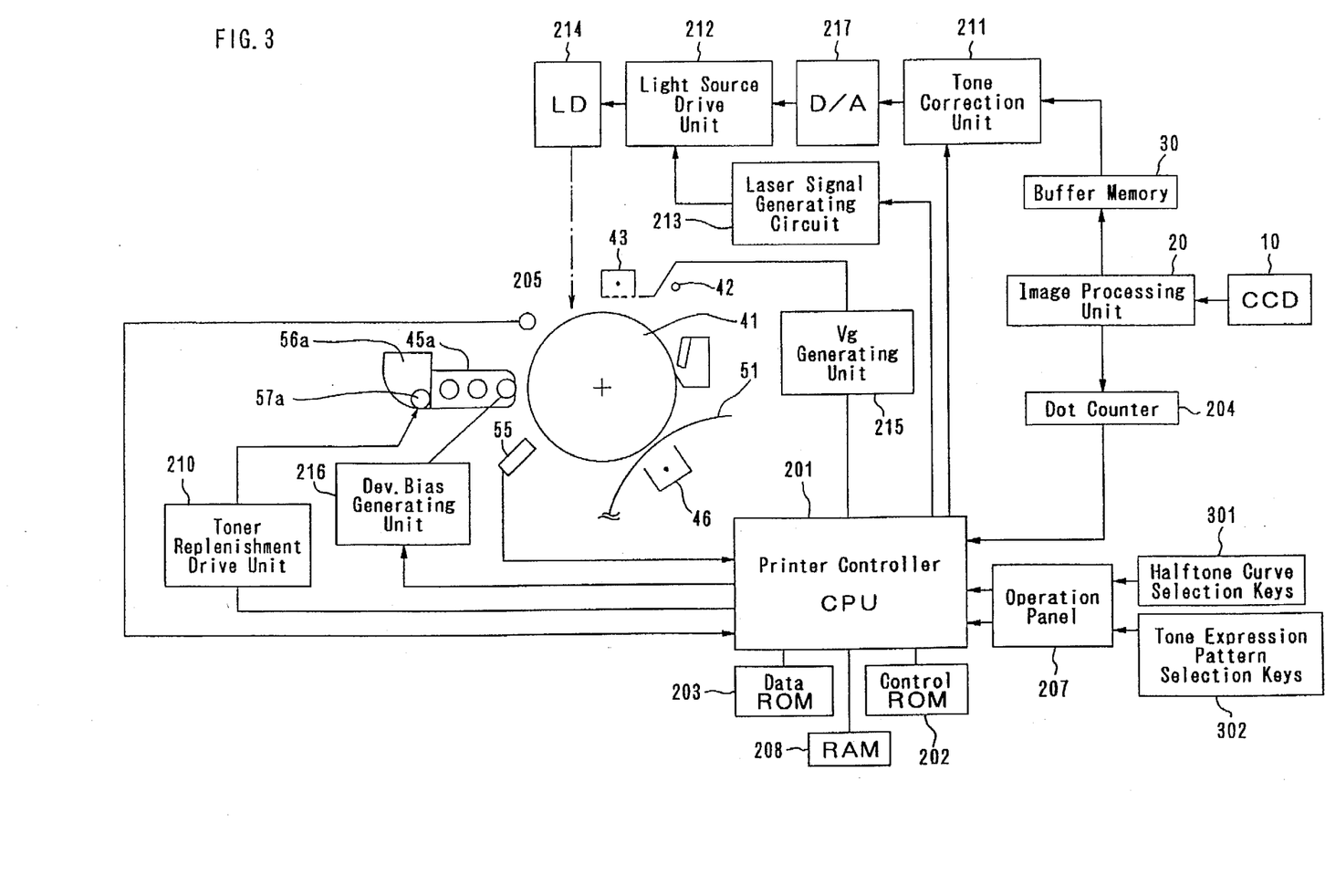
FIG. 3 is a block diagram of the control circuit of an embodiment of the digital copying apparatus.

FIG. 3 is a block diagram of the control circuit of the digital copying apparatus of the disclosed embodiment. A printer controller 201 is connected to a control ROM 202 which stores the control programs, a data ROM 203 which stores various data such as tone correction data and the like, and a RAM 208 which temporarily stores the copying conditions set by the user. The printer controller 201 executes print operation controls based on the data stored in the aforesaid ROM 202, ROM 203, and RAM 208, as well as toner replenishment controls which will be described later.

A dot counter 204 counts the value of the number of pixels of each density level 0~256 for each color cyan (C), magenta (M), yellow (Y), and black (BK) that is output from the image processing unit 20, and outputs a count value AL for each density level (where L is 0~255) to the printer controller 201. The printer controller 201 receives signals output from V0 sensor 205 which detects the surface potential V0 of the photosensitive member 41, and AIDC sensor 55 which optically detects the amount of adhered toner (image density) of a reference image on the surface of photosensitive member 41. Various data such as halftone curves and tone expression patterns are input by means of the various keys, e.g., halftone curve selection keys 301 and tone expression pattern selection keys 302, provided on the operation panel 207.

The printer controller 201 controls printing operations based on data and signals input from the operation panel 207, the dot counter 204, AIDC sensor 55, V0 sensor 205, and the ROM 203, and transmits toner resupply signals to toner replenishment drive unit 210 to estimate toner consumption and suitably resupply toner in a manner described later. Toner replenishment drive unit 210 rotates toner resupply roller 57a in accordance with toner resupply signals, so as to replenish toner. Toner replenishment drive unit 210 independently controls and rotates the individual toner resupply rollers 57a, 57b, 57c, 57d of each color cyan (C), magenta (M), yellow (Y), and black (BK), although only the toner resupply roller 57a for replenishing cyan (C) toner is shown in FIG. 3.

The printer controller 201 outputs tone correction data to a tone correction unit 211. This tone correction data corresponds to a created halftone table from the tone correction table (refer to FIG. 13) stored in the data ROM 203. In the tone correction unit 211, tone correction is performed on the 0~255 density level data output from image processing unit 20 via buffer memory 30. The halftone-corrected density level signals (image data) then are subjected to D/A conversion by a D/A converter 217, and input to a light source drive unit 212. The print controller 201 generates clock signals corresponding to the set tone expression pattern and transmits these signals to a laser signal generating circuit 213. The laser signal generating circuit 213 inputs the generated clock signals to the light source drive unit 212. The light source drive unit 212 modulates image data by the input clock signals and causes a light source 214 to emit light that is modulated in accordance with the image data.

The print controller 201 accomplishes automatic image density control by controlling Vg generating unit 215 which generates the grid voltage Vg of the charger 43, and a developing bias generating unit 216 which generates the developing bias voltage Vb for the developing devices based on the amount of adhered toner detected by AIDC sensor 55.

(2) Toner Replenishment Control

In the copying apparatus of the present embodiment, the amount of resupplied toner is controlled by detecting the amount of consumed toner used in printing a document image, based on the frequency of each density level of a document read by image reader unit 100, and the halftone expression pattern and halftone curve selected by an operator. Thus, toner replenishment is accomplished with minimal error, so as to maintain a constant toner concentration Tc in the developing device.

(2-1) Automatic Image Density Control and Tone Correction

Figure 12:
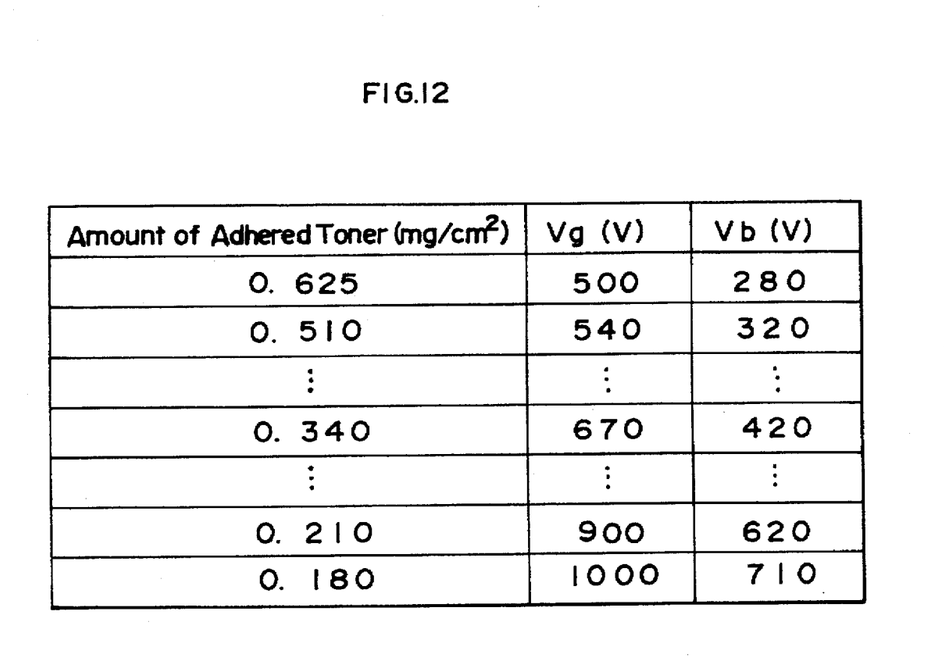
FIG. 12 is a data table used by the automatic image density control.

In the copying apparatus of the disclosed embodiment, the following automatic image density controls are executed to maintain a constant amount of adhered toner at maximum density level. Prior to starting a printing operation of an original document image, a reference toner image, which becomes the standard for density control, is formed on the surface of the photosensitive member 41 under conditions of a predetermined grid voltage Vg, predetermined developing bias voltage Vb and predetermined laser emission level. The aforesaid reference toner image is illuminated by light and the regular reflected light and scattered reflected light are detected by AIDC sensor 55 provided adjacent to the photosensitive member 41. The detection signals of the regular reflected light and scattered reflected light detected by AIDC sensor 55 are transmitted to the print controller 201. The print controller 201 determines the amount of toner that will adhere to a copy sheet, based on the difference in the aforesaid two input detection signals, thereby measuring the toner image density. Print controller 201 controls the surface potential V0 of the photosensitive member 41 in accordance with the aforesaid detection values, i.e., it controls the grid potential Vg and developing bias Vb. Specifically, the print controller 201 selectively sets the grid voltage Vg (V) and developing bias voltage Vb (V) in accordance with the amount of adhered toner (mg/cm$^2$) measured by AIDC sensor 55 with reference to a table stored in the ROM 203 and shown in FIG. 12, so as to print a document image by means of this grid voltage Vg (V) and developing bias voltage Vb (V).

The halftone characteristics of the photosensitive drum 41 change in conjunction with changes in the grid voltage Vg and the developing bias voltage Vb set by the automatic image density control. Tone correction tables corresponding to halftone expression patterns (described later) and halftone curves set by an operator are stored in the ROM 23 for each set of grid voltages Vg and developing bias voltages Vb.

Figure 13:
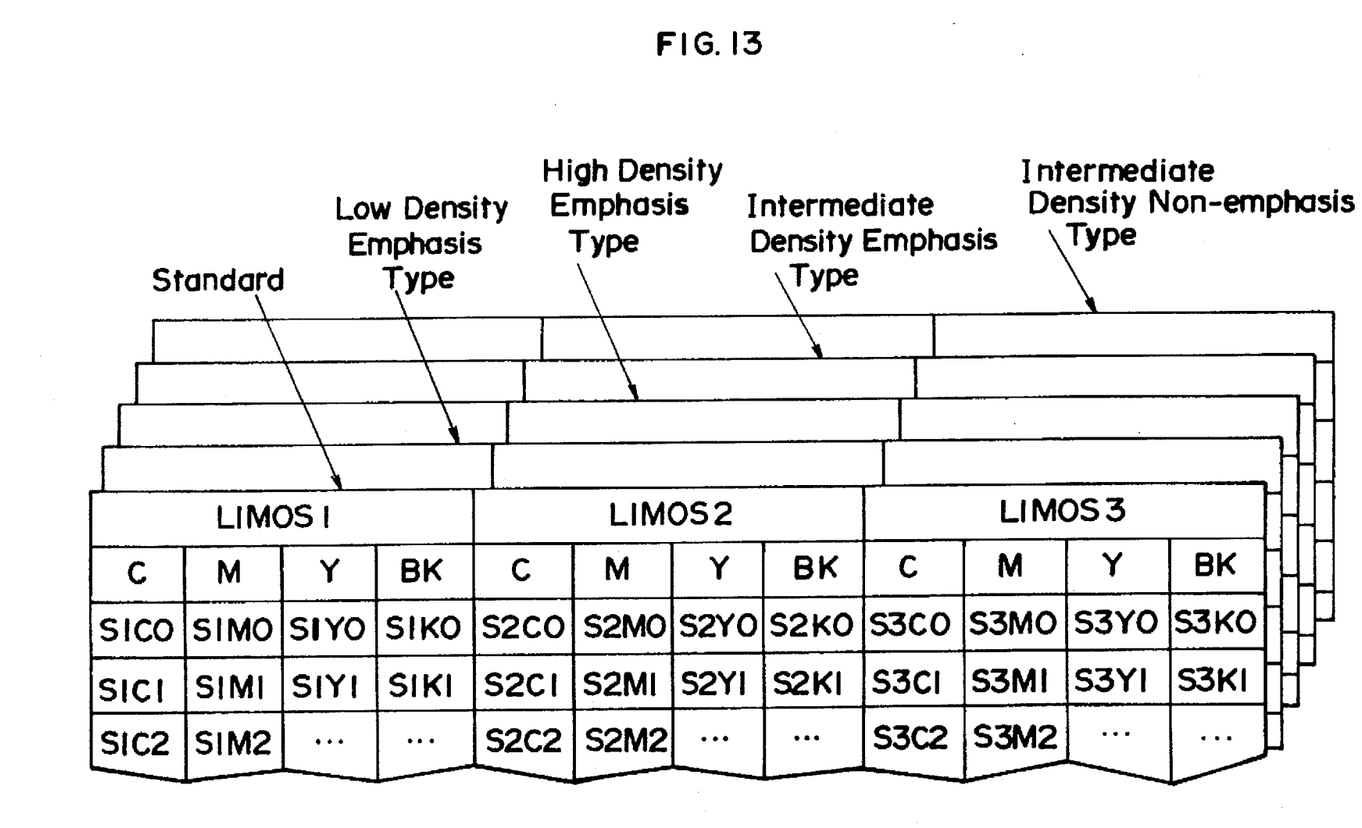
FIG. 13 is a table of tone correction data.

FIG. 13 is a table of tone correction data corresponding to specific grid voltages Vg and developing biases Vb. As shown in the table, the ROM 203 stores data tables for tone correction corresponding to five types of user selectable halftone, curves (standard, low density emphasis type, high density emphasis type, intermediate density emphasis type, intermediate density non-emphasized type) and three types of halftone expression patterns (LIMOS1, LIMOS2, LIMOS3) described later, in accordance with the grid voltage Vg and the developing bias voltage Vb set by the automatic image density control.

Although the tone correction data are conveniently expressed as symbolic codes comprised of four characters in the drawing, these data are actually stored as numerical values. The first character of the four-character symbols of the aforesaid data indicates the type of selected halftone curve, the second character indicates the type of selected halftone expression pattern, the third character indicates the print color, and the fourth character indicates the density level. For example, the symbol S1C0 in the drawing indicates that the standard (S) halftone curve is selected, and further specifies the 0-level (0) tone correction data among the 256 density levels of cyan (C) when LIMOS1 has been set. The symbol S3M2 indicates that the standard (S) halftone curve is selected, and further specifies the 2-level (2) tone correction data among the 256 density levels of magenta (M) when LIMOS3 has been set. Print controller 201 reads out the tone correction data stored in the ROM 203 which corresponds to the halftone curve and halftone expression pattern, and outputs this data to the tone correction unit 211. Thus, halftone characteristics can be changed in conjunction with changes in the grid voltage Vg and the developing bias voltage Vb set by the automatic image density control.

(2-2) Halftone Curves, Halftone Expression Patterns, and Toner Replenishment Calculation The standard halftone curve, and the other four types of halftone curves, are selectable by the operator by operating halftone curve selection keys 301 provided on the operation panel 207, as shown in FIG. 2.

Figure 4A:
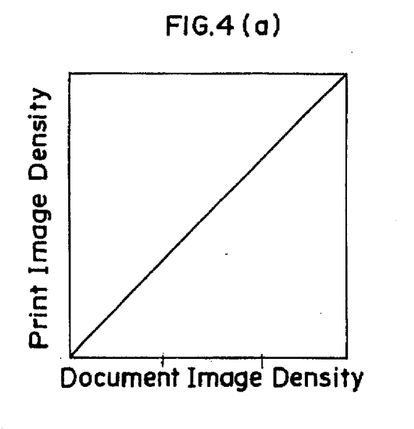
FIGS. 4(a)–4(e) are illustrations of halftone curves selectively set by an operator.

FIG. 4(a) shows the standard halftone curve selected by key 301a on the operation panel 207. In the drawing, the horizontal axis represents the document image density level, and the vertical axis represents the print image density level (tone correction data). In the case of the standard halftone curve, there is a linear correspondence between the document image density and the print image density, such that the document image can be faithfully reproduced.

FIGS. 4(b)–4(e) show the configurations of halftone curves selected by pressing halftone curve selection keys 301b–301e provided on the operation panel 207.

Figure 4B:
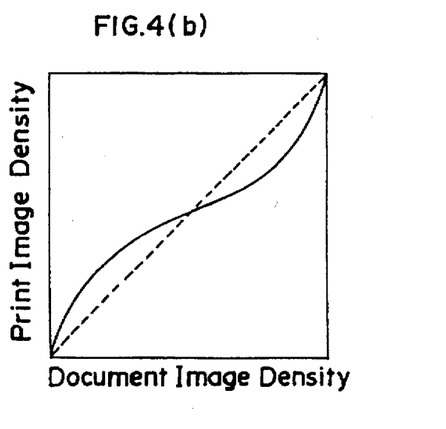

FIG. 4(b) shows the low density emphasis type halftone curve. This halftone curve is set when an operator presses halftone curve selection key 301b. When this halftone curve is selected, the density level of the original document is between low density and intermediate density, such that the emphasis is stronger than that of the standard halftone curve (indicated by the dashed line in the drawing), and the resulting printed image is thicker overall.

Figure 4C:
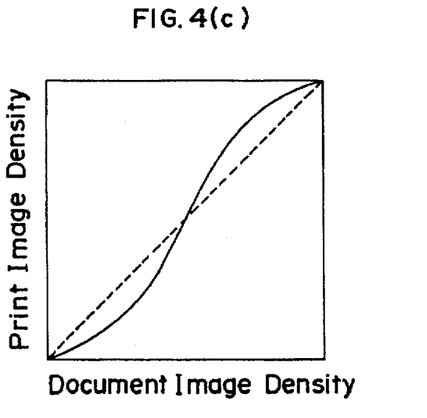

FIG. 4(c) shows a halftone curve of the high density emphasis type. This halftone curve is set when an operator presses halftone curve selection key 301c. When this halftone curve is selected, the original document image density level is between low density and intermediate density, such that the emphasis is weaker than when the standard halftone curve is selected (indicated by the dashed line in the drawing), and the resulting printed image is of a pastel tone. Furthermore, this halftone curve allows a completely dark original document image to be adjusted so as to obtain a lighter printed image.

Figure 4D:
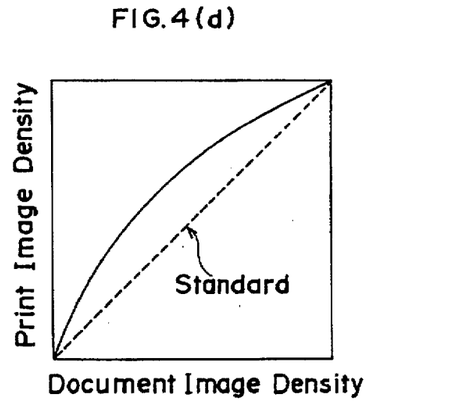

FIG. 4(d) shows a halftone curve of the intermediate density emphasis type. This halftone curve is set when an operator presses halftone curve selection key 301d. When this halftone curve is selected, the original document image density is a low density level, such that the density of the intermediate density level pixels is emphasized and brightened, and a sharp printed image is obtained.

Figure 4E:
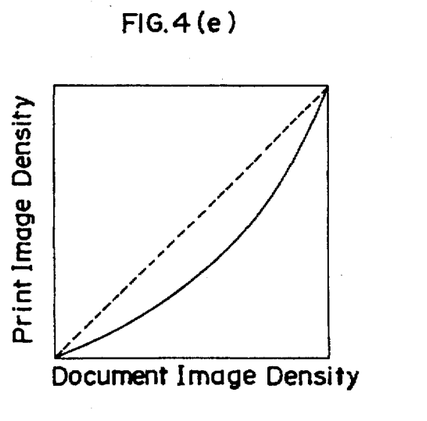

FIG. 4(e) shows a halftone curve of the intermediate density non-emphasized type. This halftone curve is selected when an operator presses halftone curve selection key 301e. When this halftone curve is selected, the original document image density is a low density level, such that the density of the intermediate density level pixels is more suppressed than the low density level pixels, and a smooth printed image is obtained.

Figure 5:
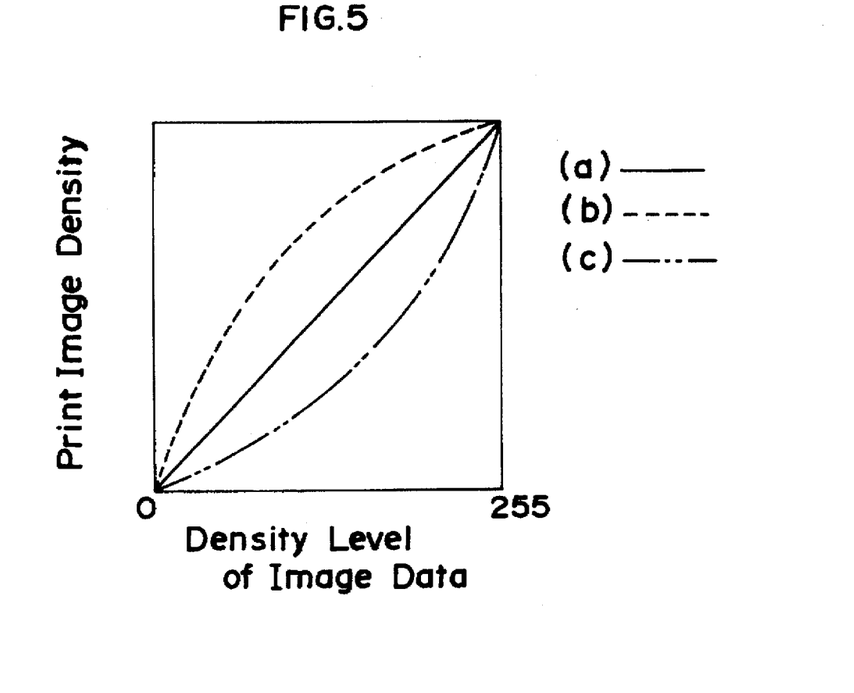
FIG. 5 is a graph showing the relationship between the print image density and the density levels of image data.
Figure 6:
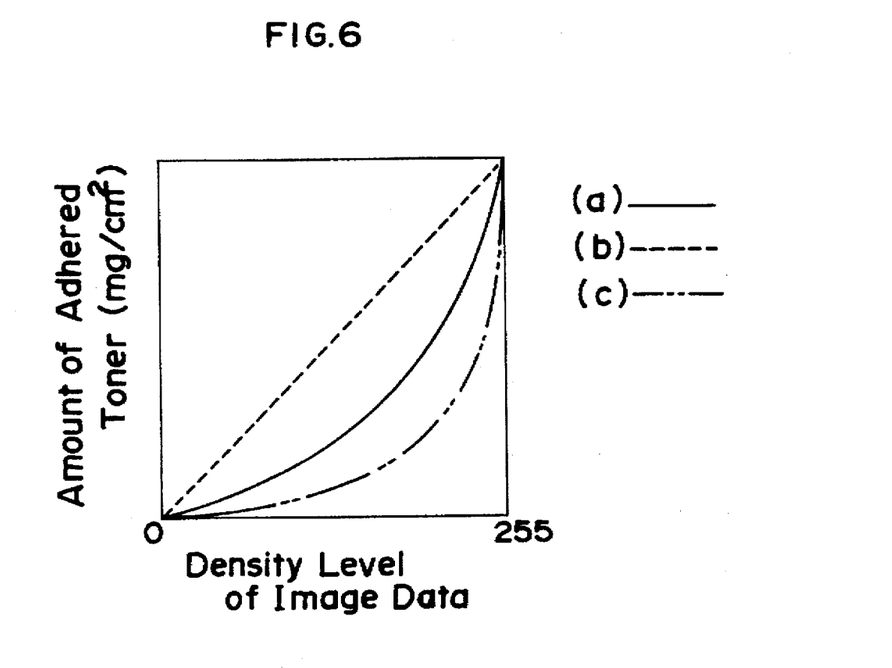
FIG. 6 is a graph showing the relationship between the toner adhesion amount and the density level of the image data.

When the standard halftone curve shown in FIG. 4(a) is used for tone correction, the density of the image printed on the copy sheet becomes darker in proportion to the increase in the density level of the scanned image as indicated by the solid line (a) in FIG. 5. The amount of toner that actually adheres to the copy sheet, however, does not increase in proportion to the density level increase, but rather increases nonlinearly as indicated by the solid line (a) in FIG. 6. This nonlinearity corresponds to the nonlinear relationship between density and amount of adhered toner. When an operator selects the halftone curve of the intermediate density emphasis type shown in FIG. 4(d), the density of the printed image relative to 0–255 density levels is set in the relationship indicated by the dashed line (b) in FIG. 5. In this case, the actual amount of toner that adheres to the copy sheet increases in conjunction with the increase in density level, as indicated by the dashed line (b) in FIG. 6. When an operator selects the halftone curve of the intermediate density non-emphasized type of FIG. 4(e), the relationship of the printed image density relative to the 0–255 density levels is set in the relationship indicated by the dashed line (c) in FIG. 5. In this case, the actual amount of toner that adheres to the copy sheet increases in conjunction with the increase in density level, as indicated by the dashed line (c) of FIG. 6.

Conventional copying apparatuses include devices which replenish toner by calculating values of the 0~255 density levels of each pixel of an original document, as well as devices which determine the amount of toner to be replenished by calculating the amount of toner consumption directly from the density level value, selecting the density levels in a plurality of areas of a scanned image, and setting a conversion coefficient for the amount of toner consumed in each area. In actual printing by the aforesaid conventional copying apparatuses, however, there are differences in the amount of consumed toner when a non-standard halftone curve is selected, e.g., when a halftone curve of the intermediate density non-emphasized type is selected. Thus, in conventional copying apparatuses, accurate toner replenishment control cannot be accomplished. In contrast, in the copying apparatus of the present invention, the frequency of pixels of each density level 0~255 in a document is calculated to determine a count value AL (where L is 0~255), and a correction coefficient aL (where L is 0~255) is determined for each density level by the selected halftone curve and is multiplied by the aforesaid determined value AL. The amount of toner consumed in conjunction with a copy operation of the document is estimated based on the sum total value determined by the aforesaid multiplication relative to each density level, so as to set the amount of toner to be resupplied.

Figure 14:
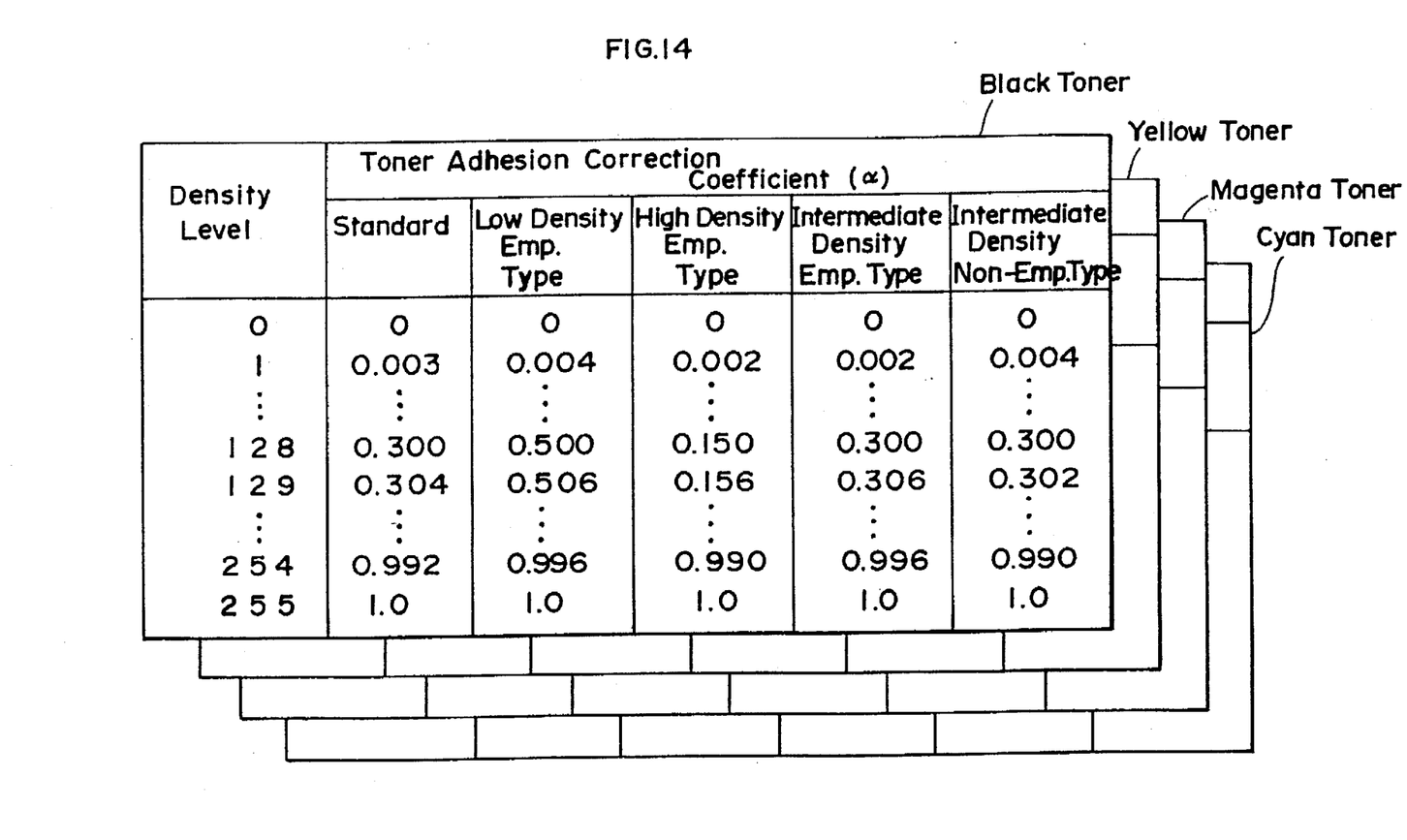
FIG. 14 is a data table of toner correction coefficients for each density level.

FIG. 14 shows a table of toner adhesion correction coefficients αL for each density level, determined in accordance with the halftone curve selected by the operator. A table is provided for toner of each color because the relationship between the amount of adhered toner and the print density is different depending on the color of the toner. These correction coefficients are empirically determined to take into account the characterstics of the copying apparatus, the toner and the tone particular correction curve.

The toner consumption calculation is explained following the halftone expression pattern discussion below.

An operator can select three sets of laser emission cycles N (dots) and emission duty ratios X (%) by pressing halftone expression pattern selection keys 302a~302 provided on the operation panel 207 shown in FIG. 3. Thus, a reproduced image of a desired image quality can be formed on the copy sheet. When key 302a is pressed, the laser emission cycle N is set at N=2, and the emission duty ratio X is set at X=100(%). The halftone expression pattern obtained by the aforesaid settings is designated LIMOS1. In this case, a high resolution reproduced image is obtained. When key 302b is pressed, the laser emission cycle N is set at N=2 (dots), and the emission duty ratio X is set at X=80(%). The halftone expression pattern obtained by the aforesaid settings is designated LIMOS2. In this case, vertical line patterns are formed which make it difficult for noise to be generated between lines in the subscanning direction. When key 302c is pressed, the laser emission cycle N is set at N=2, and the emission duty ratio X is set at X=60(%). The halftone expression pattern obtained by the aforesaid settings is designated LIMOS3. In this case, the aforesaid vestical line patterns are strongly reproduced such that the obtained image is smoother overall compared to the reproduced image obtained when the aforesaid key 302b is pressed, because there are places on the copy sheet at which toner is not adhered at all.

Figure 7A:
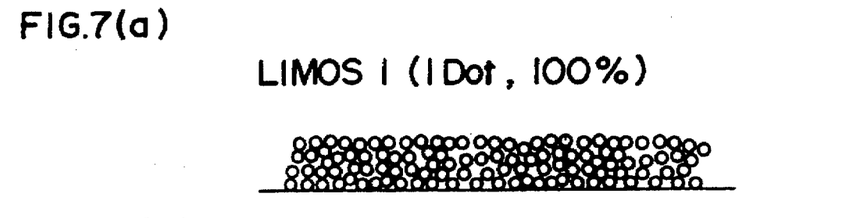
FIGS. 7(a)–7(c) illustrate the conditions of toner adhesion on a copy sheet.
Figure 7B:
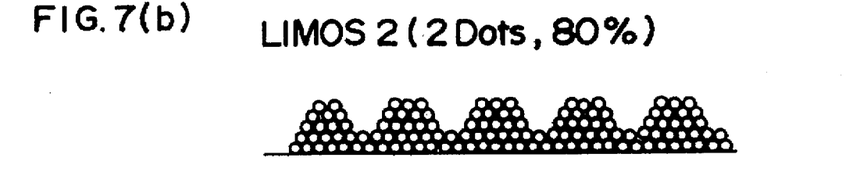
Figure 7C:
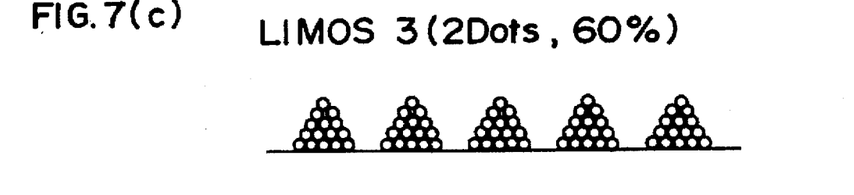
Figure 8:
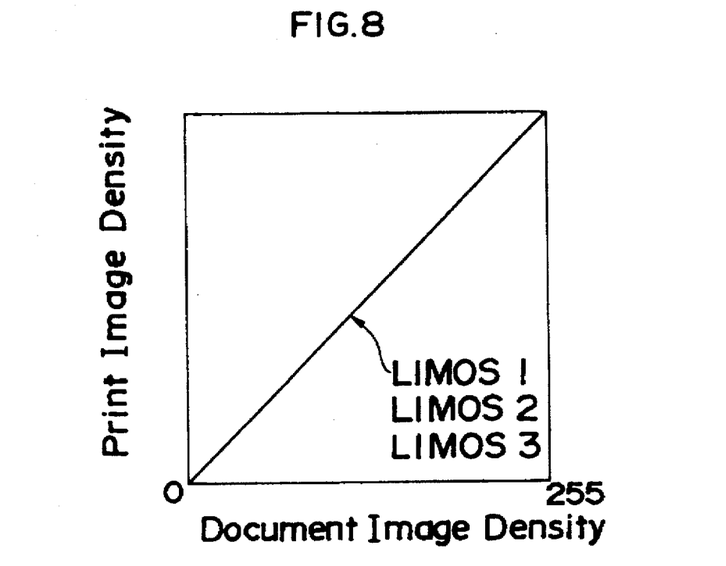
FIG. 8 is a graph showing the relationship between print image density and document image density.
Figure 9:
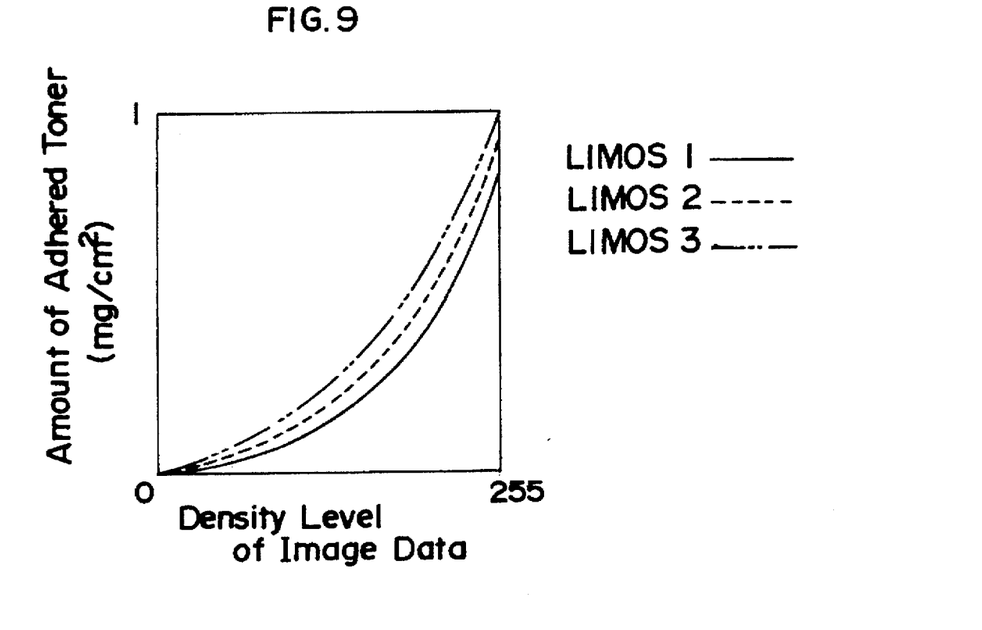
FIG. 9 is a graph showing the relationship between toner adhesion amount and the density level of image data.
Figure 10:
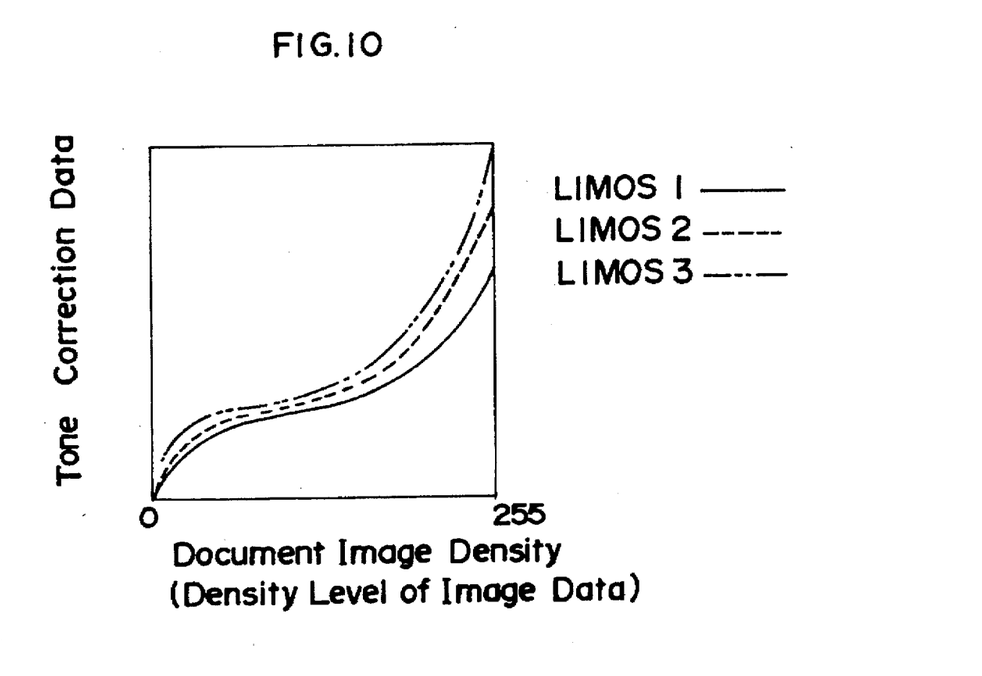
FIG. 10 is a graph showing the relationship between tone correction data levels and document image density.

FIG. 7 illustrates the amount of toner adhered to the copy sheet when (a) LIMOS1, (b) LIMOS2, and (c) LIMOS3 are set by pressing keys 302a, 302b, and 302c, respectively. As can be seen in the drawing, there are places where toner adheres to the copy sheet and places toner does not adhere to the copy sheet when the emission duty ratio is smaller. That is, even though laser emission intensity is identical, the density of the image reproduced on the copy sheet paper is reduced. In the case of the standard curve having a relationship between the document image density level and the print image density actually output on paper as shown in FIG. 8, increasing toner adhesion in the order LIMOS1, LIMOS2, LIMOS3 is necessary as shown in FIG. 9. Thus, when tone correction data are set for each of LIMOS1, LIMOS2, and LIMOS3, the laser emission intensity becomes stronger even when the density levels of the image data are identical, as shown in FIG. 10. The other four halftone curves besides the aforesaid standard halftone curve can set tone correction data so as to increase the laser emission intensity in the order LIMOS1, LIMOS2, LIMOS3, and this tone correction data may be stored in the ROM 203 as tone correction data tables, as previously described.

Figure 15:
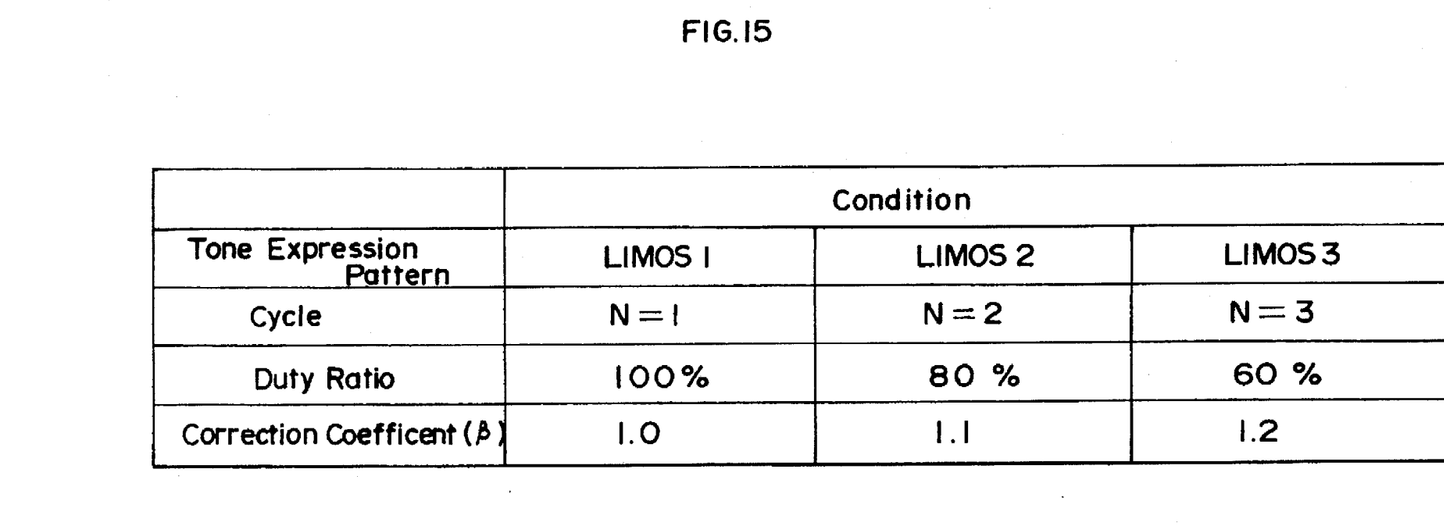
FIG. 15 is a data table of toner correction coefficients for each halftone expression pattern.

Since the amount of adhered toner for the same image density level differs depending on the halftone expression pattern, a correction coefficient β is determined for each halftone expression pattern, as shown in FIG. 15.

The toner consumption calculation sets the correction coefficient αL corresponding to the set halftone curve with reference to the table of FIG. 14 for each density level (256), and sets the correction coefficient β corresponding to the selected halftone expression pattern with reference to the table of FIG. 15. Then, each correction coefficient αL is multiplied by the count value AL expressing the frequency of each density level, and this total value is multiplied by the correction coefficient β to determine a toner consumption coefficient T, as described by the mathematical expression below. The print controller 201 estimates the amount of toner consumption from the toner consumption coefficient T, and sets the toner replenishment amount.

$$T = \beta \Sigma (AL \times \alpha L)$$

Therefore, toner consumption estimation accuracy is improved and stabilized toner replenishment control is realized by selecting the optimum toner adhesion coefficient in accordance with the aforesaid halftone curves and halftone expression patterns.

Figure 11:
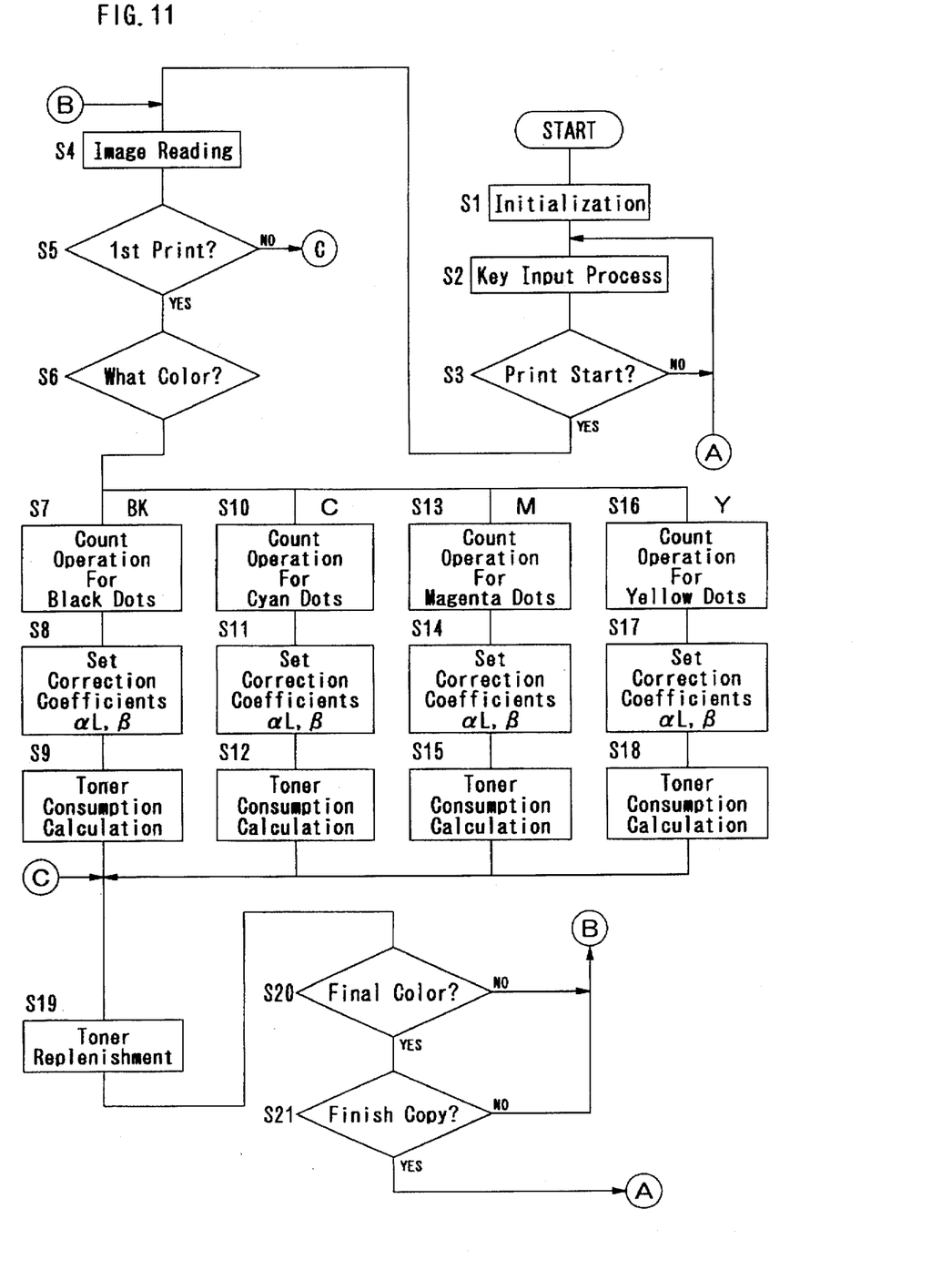
FIG. 11 is a flow chart showing the toner replenishment control process executed by the embodiment of the copying apparatus.

The toner replenishment control operation is described hereinafter with reference to the flow chart of FIG. 11.

When the power source of the copying apparatus is turned ON, initialization is executed to set initial settings, including the previously described automatic density control (step S1). Then, the key input process is executed (step S2). In this process, an operator inputs the copy number for example, and selects a desired halftone curve and halftone expression pattern from the operation panel 207. A check is made to determine whether or not the print start switch is ON. If the print start switch is OFF (step S3: NO), the routine returns to step S2. If the print start switch is ON (step S3: YES), the document is scanned, and 8-bit signals (signals expressing density levels) are generated for cyan (C), magenta (M), yellow (Y), and black (BK) by the image signal processing unit 20 (step S4). Then, a check is made to determine whether or not a single page print operation is to be performed for the scanned document (step S5). If the first print is to be executed, the routine advances to step S6, and the next step is determined in accordance with the color of the toner used for image formation (step S6).

Subsequent steps S7~S9, steps S10~S12, steps S13~S15, and steps S16~S18 are basically identical although different toner replenishment amounts are calculated depending on the color of the toner used for image formation. For example. In the case of the calculation for black (BK) toner replenishment (steps S7–S9), the frequency of each of the 256 density levels is counted for a single image by dot counter 204, based on the black (BK) 8-bit signal generated in step S4, so as to determine the count value AL (L is in the range 0–255). Each count value AL is transmitted to the print controller 201 (step S7). The black (BK) toner correction coefficient αL and correction coefficient β, which correspond to the density levels relating to the halftone curve and halftone expression pattern set by key input in step S2, are respectively read out from the tables stored in the ROM 203 and shown in FIGS. 14 and 15 (step S8). As shown in the aforesaid mathematical expression, a toner correction coefficient αL for the selected black (BK) toner is multiplied by the count value AL of each density level per single image, and the sum total value of the all multiplied density levels is multiplied by a correction coefficient β to determine a toner consumption coefficient T (step S9). The rotation time is determined for toner resupply roller 57d of developing device 45d for black (BK) toner from the calculated toner consumption coefficient T, and toner replenishment is accomplished during the copy time of the number of copies specified in the RAM 208 (step S9). The rotation time of the toner resupply roller 57d is determined by multiplying the aforesaid toner consumption coefficient T by a conversion constant H for the rotation time set for each color. In step S19, the print operation is executed and a black (BK) toner image is formed on the copy sheet, and toner resupply roller 57d is controlled so as to be rotated only for the calculated replenishment time.

A determination is then made as to whether or not the final color has been printed, in step S20. If the final color has not been printed (step S20: NO), the previously described steps S4–S19 are repeated. When the final color has been printed (step S20: YES), the copy sheet bearing the toner image is separated from transfer drum 51 and transported to fixing device 48 whereupon the toner image is heat-fixed thereon. In step S21, the number of completed documents and the number of copies set by the operator are verified to determine whether or not the copy operation is finished. If the copy operation is finished (step S21: YES), the routine returns to step S2, and subsequent key input is awaited. If the copy operation is determined to be still unfinished (step S21: NO), the routine returns to step S4, and the copy operation continues. When making copies after the first copy, as determined in step S5, steps S7–S18 are skipped, the toner consumption coefficient T stored in RAM 208 for a single sheet is read out, the toner resupply roller rotation time is determined, and toner is replenished at step S19 as the copy operation continues.

In the image forming apparatus having the aforesaid toner replenishment control, accurate toner replenishment is possible by means of precise correction by the differences in toner consumption determined through halftone curves and halftone expression patterns, rather than differences in the amount of toner consumption determined through differences in document image density distributions. Although 256 document data density levels are counted in the above embodiment, the present invention is not limited to this number of density levels inasmuch as less than 256 levels, for example 32 levels or 16 levels, may be used in accordance with the required estimation precision. While the above-mentioned embodiment has been described in terms of forming an entire document by halftone expression patterns and determining the toner replenishment amount using a correction coefficient corresponding to that pattern, it is also possible to read a document and distinguish solid image regions and line image regions of text characters in the image processing unit, and automatically convert halftone expression patterns. In such a case, image data is counted for each halftone expression pattern, correction coefficients are selected corresponding to the count values, and the amount of toner replenishment is calculated, and toner replenishment is accomplished based on the total value of the calculated values.

It will be appreciated by those of ordinary skill in the art that the present invention can be embodied in other specific forms without departing from the spirit or essential characteristics thereof. The presently disclosed embodiments are considered in all respects to be illustrative and not restrictive. The scope of the invention is indicated by the appended claims rather than the foregoing description, and all changes that come within the meaning and range of equivalence thereof are intended to be embraced therein.

What is claimed is:

1. An image forming apparatus comprising:
    print means for printing an image with a developer, based on print data, said print means having a plurality of tone correction relationships for converting image data expressing density of each pixel of an image to be printed into print data;
    selection means for selecting one of said tone correction relationships, wherein said print means prints an image based on print data converted by said tone correction relationship selected by said selection means; and
    calculation means for calculating an amount of developer consumed by said print means, said calculation means having a plurality of coefficients corresponding to said tone correction relationships and calculating the amount of the consumed developer by multiplying pixel frequency at each density level of the image data by said coefficients corresponding to the selected tone correction relationship.

2. The image forming apparatus as claimed in claim 1 further comprising toner replenishment means for replenishing developer based on the amount of developer consumption calculated by said calculation means.

3. The image forming apparatus as claimed in claim 1, wherein said print means includes a memory storing a plurality of conversion tables each of which represents one of said tone correction relationships.

4. The image forming apparatus as claimed in claim 1, wherein said developer includes toner and carrier.

5. An image forming apparatus comprising:
    a light source;
    modulation means for modulating light emitted by said light source in accordance with image data expressing density of each pixel of an image to be printed, said modulation means being capable of operating in accordance with a plurality of tone correction methods for converting image data expressing the density level of each pixel into drive signals to modulate said light source;
    selection means for selecting one of said plurality of tone correction methods, whereby said modulation means operates in accordance with the tone correction method selected by said selection means;
    a photosensitive member having a surface on which is formed an electrostatic latent image by means of exposure to light emitted by said light source, as modulated by said modulation means;
    developing means for developing with toner an electrostatic latent image formed on the surface of said photosensitive member;
    counting means for counting the number of pixels of each density level of image data to be printed;

correction coefficient setting means for determining a correction coefficient to calculate the amount of toner consumed by said developing means at each density level in accordance with the tone correction method selected by said selection means; and toner consumption calculation means for calculating the amount of toner consumed by a developing device from the sum total value of multiplication results of each density level when the correction coefficient determined by said correction coefficient setting means is multiplied by the number of pixels of each density level counted by said counting means.

6. The image forming apparatus as claimed in claim 5 further comprising toner replenishment means for resupplying toner to said developing means based on the amount of toner consumption determined by said toner consumption calculation means.

7. An image forming apparatus comprising:

a light source;

modulation means for modulating the intensity of light emitted from said light source in accordance with image data expressing the density of each pixel of an image to be printed;

modulation selection means for variable control of the ratio of a non-emission period and an emission period when a non-emission period is provided in the emission control of said light source by said modulation means;

a photosensitive member having a surface on which is formed an electrostatic latent image by means of exposure to light emitted by said light source, as modulated by said modulation means;

developing means for developing with toner an electrostatic latent image formed on the surface of said photosensitive member;

counting means for counting the number of pixels of each density level of image data to be printed;

correction coefficient setting means for determining a correction coefficient to calculate the amount of toner consumed by said developing means at each density level in accordance with said ratio set by said modulation selection means; and toner consumption calculation means for calculating the amount of toner consumed by a developing device from the sum total value of multiplication results of each density level when the correction coefficient determined by said correction coefficient setting means is multiplied by the number of pixels of each density level counted by said counting means.

8. The image forming apparatus as claimed in claim 7 further comprising toner replenishment means for resupplying toner to said developing means based on the amount of toner consumption determined by said toner consumption calculation means.

9. An image forming apparatus comprising:

conversion means for converting image data expressing density of each pixel of an image to be printed into print data;

a light source;

modulation means for modulating the intensity of light emitted from said light source in accordance with print data converted by said conversion means;

first determination means for determining a tone correction relationship between a value of image data and a corresponding value of the print data, wherein said conversion means converts image data to print data based on said determined tone correction relationship;

second determination means for determining the ratio of a non-emission period and an emission period in the control of said light source by said modulation means, wherein said modulation means drives said light source based on said determined ratio;

a photosensitive member having a surface on which is formed an electrostatic latent image by means of exposure to light emitted by said light source, as modulated by said modulation means;

developing means for developing with toner an electrostatic latent image formed on the surface of said photosensitive member;

counting means for counting the number of pixels of each density level of image data to be printed;

correction coefficient setting means for setting a first correction coefficient for each density level based on said determined tone correction relationship and a second correction coefficient based on said determined ratio; and toner consumption calculation means for multiplying the counted number of pixels by the first correction coefficient for each density level, summing multiplication results of each density level, and multiplying the sum total value by said second correction coefficient to obtain an amount of toner consumed in an image forming process.

10. The image forming apparatus as claimed in claim 9 further comprising toner replenishment means for resupplying toner to said developing means based on the amount of toner consumption determined by said toner consumption calculation means.

11. A toner replenishment method used in image forming apparatus which forms a halftone image with toner based on print data, said toner replenishment method comprising steps of:

selecting one of a plurality of tone correction relationships for convening image data expressing density of each pixel of an image into print data;

counting the number of pixels of each density level of image data to be printed;

setting a correction coefficient for each density level in accordance with the selected tone correction relationship;

multiplying the counted number of pixels by the set correction coefficient for each density level and summing multiplication results of each density level to obtain an amount of toner consumed in an image forming process; and replenishing toner based on the amount of toner.

12. A toner replenishment method used in image forming apparatus which forms a halftone image with toner by modulating light intensity in accordance with image data expressing the density of each pixel of an image to be printed, said toner replenishment method comprising steps of:

determining the ratio of a non-emission period and an emission period in light modulation, wherein the intensity of light is modulated at the determined ratio;

counting the number of pixels of each density level of image data to be printed;

setting a correction coefficient in accordance with the determined ratio;

calculating an amount of toner consumed in an image forming process by using said determined coefficient and the counted number; and replenishing toner based on the calculated amount of toner.

* * * * *